3,819,628
2-PHENYL-4-SUBSTITUTED AMINO-QUINAZOLINES AND NITRATES THEREOF

William R. Simpson, Mendham, N.J., assignor to Sandoz-Wander, Inc., Hanover, N.J.
No Drawing. Filed July 31, 1972, Ser. No. 276,794
Int. Cl. C07d 51/48
U.S. Cl. 260—256.4 Q    10 Claims

ABSTRACT OF THE DISCLOSURE

Quinazolines substituted at the 2- position by a phenyl group and at the 4- position by an amino function bearing a hydroxy-alkyl nitrate moiety, e.g., 4-(5-hydroxypentyl)-amino-2-phenyl-6,7-dimethoxy-quinazoline nitrate. The compounds have pharmacological activity in animals and are useful, for example, as anti-anginal agents and in the treatment of arrhythmia. Also disclosed are the corresponding hydroxy intermediates which are useful in preperation of the nitrates and also as anti-anginal agents or as agents in the treatment of arrhythmia.

---

This invention relates to quinazoline derivatives, and more particularly to quinazolines which are substituted at the 2- position by a phenyl group and at the 4- position by an amino function bearing a hydroxyalkyl nitrate moiety. The invention also relates to pharmaceutical methods and compositions utilizing said compounds. The invention further relates to certain corresponding hydroxyalkyl substituted quinazolines useful as intermediates in preparation of said nitrates and also useful per se as pharmaceutically active substances.

In prior applications of myself and Lloyd P. Gabel, Ser. No. 89,472 filed Nov. 13, 1970 and now United States Letters Patent 3,637,700, and Ser. No. 838,050 filed June 26, 1969 and now United States Letters Patent 3,637,701, there are described certain quinazolines substituted at the 4-position by a moiety containing a 4-amino function bearing a hydroxyalkyl nitrate group, such compounds being useful as anti-anginal agents, and suitably prepared from their corresponding hydroxy intermediates which also possess pharmacological activity.

The compounds of the invention may be represented by the structural formula I:

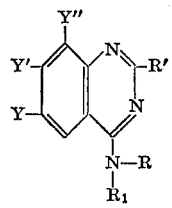

wherein
R' is

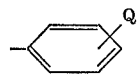

Q is hydrogen, halo of atomic weight of from 18 to 80 or lower alkyl of 1 to 4 carbon atoms,
R is from the group of (a) —CH$_2$(—CH$_2$)$_n$—ONO$_2$ (b) —CH$_2$(—ĊH)$_n$—ONO$_2$
    $\quad\quad\; R°$ (c) —ĊH(—CH$_2$)$_n$—ONO$_2$
    $\; R''$ (d) —CH$_2$(—CH$_2$)$_x$—N[—CH$_2$(CH$_2$)$_y$—ONO$_2$]$_2$ R$_1$ is from the group of (e) —CH$_2$(—CH$_2$)$_n$—ONO$_2$ when R is (a) as above defined, (f) hydrogen or lower alkyl of 1 to 4 carbon atoms, and R'' is —(CH$_2$—)$_x$CH$_3$ or —(CH$_2$—)$_y$ONO$_2$
R° is hydrogen, —(CH$_2$—)$_m$CH$_3$ or
    —(CH$_2$—)$_y$ONO$_2$, provided that one R° (and only one) is other than hydrogen, that the sum of $n$ and $m$ does not exceed 7 and that the sum of $n$ and $y$ does not exceed 8, or R and R$_1$ together with the 4-amino nitrogen attached to the quinazoline ring form

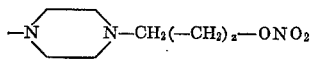

$x$ is 0 or 1,
$n$ is 1 to 6, preferably 3 to 5,
$m$ is 0 to 4,
$y$ is 1 to 4,
$z$ is 1 to 4, and each of Y, Y' and Y'' is hydrogen, lower alkoxy of 1 to 3 carbon atoms, e.g., methoxy or lower alkyl of 1 to 3 carbon atoms, e.g., methyl, or Y and Y' together form methylenedioxy; provided that no more than 2 of Y, Y' and Y'' are lower alkyl; or a pharmaceutically acceptable non-toxic acid addition salt thereof.

A preferred method for preparation of the compounds of formula I involves in a Step A reaction the nitration of the corresponding hydroxy compound of formula II:

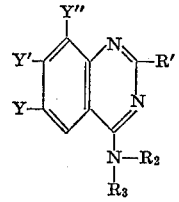

wherein Y, Y', Y'' and R' are as defined and R$_2$ and R$_3$ are the non-nitrate bearing hydroxyalkyl substituents corresponding to R and R$_1$, respectively, i.e.

R$_2$ is from the group of:

(a) $\quad\quad\quad$ —CH$_2$(—CH$_2$)$_n$—OH (b) $\quad\quad\quad\;\; \begin{pmatrix} R_a° \\ | \end{pmatrix}$
    $\quad$ —CH$_2$ $\begin{pmatrix} \;\;\;\; \\ -CH \end{pmatrix}_n$ —OH, (c) $\quad\quad\quad\;\; R_a'$
    $\quad\quad\quad\;\; |$
    $\quad\quad\quad\;\;$ ĊH(—CH$_2$)$_n$—OH (d) $\quad\quad$ —CH$_2$(—CH$_2$)$_x$—N[CH$_2$(—CH$_2$)$_y$—OH]$_2$ R$_3$ is from the group of:
(e) —CH$_2$(—CH$_2$)$_n$—OH when R$_2$ is (a) as above defined, (f) hydrogen or lower alkyl of 1 to 4 carbon atoms,
R$_a$' is —CH$_2$—)$_x$ or —(CH$_2$—)$_y$OH,
R$_2$° is hydrogen, —(CH$_2$—)$_m$CH$_3$ or
    —(CH$_2$—)$_y$OH, provided that one R$_a$° is other than hydrogen, that the sum of $n$ and $m$ does not exceed 7 and that the sum of $n$ and $y$ does not exceed 8, or R$_2$ and R$_3$ together with the 4-amino nitrogen attached to the quinazoline ring form

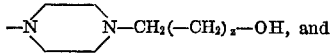

$n$, $m$, $y$ and $z$ and Y, Y' and Y'' are as defined.

The preparation of compounds I by step A involves a nitration reaction which may be carried out in a manner known per se for nitrating hydroxyalkyl groups. A preferred method of conducting the nitration involves the reaction of a compound II with nitric acid in presence of a carboxylic acid anhydride which is preferably of from 3 to 8 carbon atoms, more preferably acetic acid anhydride. The reaction may be suitably carried out in an organic solvent medium at temperatures in the range of from minus 70° C. to plus 50° C., preferably minus 5° C. to plus 20° C. The solvent medium for the reaction is preferably provided by employing a lower aliphatic carboxylic acid, e.g., acetic acid, although other well known organic solvents may be employed or the reaction may be carried out employing an excess of the carboxylic acid anhydride. The product compound I may be isolated from the reaction mixture of Step A by working up by established procedures.

A preferred method for preparation of compounds II involves a Step B reaction of a 4-haloquinazoline of formula III:

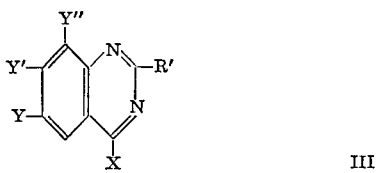

III wherein Y, Y', Y" and R' are as defined and X is halo from the group of chloro or bromo, preferably chloro, with a compound of formula IV:

IV wherein $R_2$ and $R_3$ are as defined.

The reaction of Step B is of known type and may be carried out in a conventional manner by subjecting a compound III to reaction with the compound IV at elevated temperatures which may be suitably in the range of 30° C. to 180° C., preferably 60° C. to 160° C. The reaction may be suitably carried out in an inert organic solvent which may be any of several of the well-known conventional solvents, preferably an aromatic solvent such as benzene. Another preferred solvent is isopropanol. Alternately, the reaction may be initiated and/or carried out in the inert liquid medium provided by employing an excess of compound IV when the compound is liquid at the reaction temperature or by fusion of solid reactants. An acid binding agent such as sodium carbonate may be also employed to advantage in the reaction, if desired. The reaction product compound II may be isolated from the reaction mixture of Step B by established procedures.

The compounds of formulae III and IV are either known or may be prepared from known materials by established procedures. Compounds of the formula III and the 2-phenyl-[3H]-4-quinazolones from which they are preferably prepared are described, for example, by Noland et al., J. Org. Chem. 27, 341–342 (1962); Golomolzin et. al., Khim. Geterotsiki. Soedin 6, 1131–3 (1969); and Golomolzin et al., Khim. Geterotsiki. Sordin 6, 855–8 (1970). See also Piozzi et al. Gazz. Chim. ital. 89, 2342–58 (1959).

Also within the scope of the novel compounds of the invention are pharmaceutically acceptable salts not materially affecting the pharmacological effect of the compounds of formula I and formula IIa. Such salts include the acid addition salts, e.g., the methane sulfonate, hydronitrate, hydrosulfate, fumarate, hydrochloride and maleate. It is convenient to prepare the compounds of formula I as a hydronitrate addition salt. Such salts may be then readily converted to the free bases by conventional procedures. In preparing the free bases from the acid addition salt, it is also convenient to employ a buffer system, e.g., a system comprising a 1:1 molar mixture of acetic acid and sodium acetate, followed by working up by conventional procedures. The free bases may be readily converted into the hydronitrate and other acid addition salts by established procedures. The compounds of the formula II may be also prepared as acid addition salts and converted to free base form, and vice versa, by conventional procedures.

The compounds of formula I and the formula II and their pharmaceutically acceptable acid addition salts are useful because they possess pharmacological activity in animals. In particular, the compounds of the formula I are useful as antianginal agents as indicated by effecting coronary dilation in the anesthetized dog on intravenous administration and measurement of blood flow through the anterior descending branch of the left coronary artery. For such use the dosage administered will vary depending upon known factors such as the compound used, mode of administration and the severity of the condition being treated. However, in general, the compounds of the formulae I and II may be administered to obtain satisfactory results as anti-anginal agents when administered orally or parenterally at a daily dosage of from 0.2 to 100 milligrams per kilogram of body weight, given as required or in divided doses or in sustained release form. For most larger mammals a dosage of from 16 to 500 milligrams, pro re nata, provides satisfactory results. The compounds may also be used prophylactically in mammals to prevent or minimize angina attacks at a daily dosage of 16 to 500 milligrams, or in divided doses of from 4 to 250 milligrams.

The compounds of formula I and the formula II are also useful as anti-arrhythmic agents, as indicated by polygraph recordings on intravenous administration to the anesthetized dog given Ouabain until the appearance of constantly-occurring ventricular ectopic beats and then the test compound every two minutes until the arrhythmia reverts to sinus rhythm. For this use satisfactory results, in general, are obtained when administered orally or parenterally at a daily dosage of from 0.2 to 100 milligrams per kilogram of animal body weight. For most mammals the administration of from 16 to 500 milligrams of the compound per day provides satisfactory results and divided dosage forms suitable for internal administration comprise from about 4 to 250 milligrams in admixture with a solid or liquid pharmaceutical carrier or diluent.

For the above uses, the compounds of the formulae I and II may be combined with a pharmaceutically acceptable carrier, and such other conventional adjuvants as may be desired or necessary, and the resulting composition administered orally in such forms as tablets, capsules, elixirs, suspensions and the like or parenterally in the form of an injectable solution or suspension. Such compositions may be prepared according to any method known in the art for the manufacture of pharmaceutical compositions. In general, the compositions of the invention adapted for either oral or parenteral administration may contain 1% to 90% by weight of the active ingredient in combination with the inert carrier, more usually 3% to 40%.

A representative formulation is a capsule for oral administration 2 to 4 times a day to prevent or lessen the severity of anginal attacks and prepared by standard capsulating techniques to contain:

| Capsule ingredients | Weight (mg.) |
|---|---|
| 4 - (5 - hydroxypentyl) - 2-phenyl-6,7,8-trimethoxy-quinazoline hydrochloride | 50 |
| Lactose | 300 |

The following examples are given for the purpose of illustration only:

EXAMPLE 1

4-[4-(2-hydroxyethyl)piperazino]-2-phenyl-6,7,8-trimethoxy quinazoline nitrate and dihydrochloride

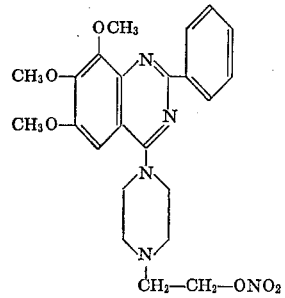

Step A: Preparation of 2-amino-3,4,5-trimethoxy benzamide.—62 g. 2-amino-3,4,5-trimethoxy methyl benzoate is allowed to reflux in 60 mls. hydrazine for 20 minutes in order for the reaction to go to completion. The mixture is evaporated to dryness under reduced pressure. The resulting white crystalline mass is added to 500 mls. isopropanol along with 75 g. (wet) Raney nickel which has been washed several times with isopropanol. After 10 hours reflux under nitrogen, the Raney Nickel is filtered off and washed with isopropanol. The filtrate is evaporated to give solids which are in turn filtered through 400 mls. silica gel using chloroform to elute the column. The chloroform solution is evaporated to an oil which is crystallized upon the addition of dry ether. The product is filtered and dried to yield 2-amino-3,4,5-trimethoxy benzamide, m.p. 125–127° C.

Step B: Preparation of 2-benzamido-3,4,5-trimethoxy benzamide.—30 g. 2-amino-3,4,5-trimethoxy benzamide and 20.0 mls. triethylamine are dissolved in 350 mls. ethanol free chloroform, cooled in an ice bath and 17.0 mls. benzoyl chloride is added dropwise while keeping the temperature below 20° C. After addition, crystals are formed and after stirring ½ hour at room temperature, the crystals are filtered, washed with chloroform and dried to yield 2-benzamido-3,4,5-trimethoxy benzamide, melting first at 185° C. and again at 195–202° C.

Step C: Preparation of 2 - phenyl - 6,7,8-trimethoxy-[3H]-4-quinazolone.—44 g. of 2 - benzamido - 3,4,5-trimethoxy benzamide is added to 200 mls. of a mixture of 23.5% by weight biphenyl and 66.5% by weight biphenyl ether at 190–200° C. After addition (5 min.), the mixture is allowed to reflux for 35 minutes. The mixture is then cooled and 10 mls. heptane is added. The resulting crystals are filtered, washed several times with heptane and dried to yield an impure product which is added to 600 mls. hot 50% methanol/chloroform. The solvent is allowed to boil down to a volume of 400 mls. After cooling, the crystals are filtered, washed with chloroform and dried to yield 2-phenyl-6,7,8-trimethoxy[3H]-4-quinazolone, M.P. 243–247° C.

Step D: Preparation of 2 - phenyl - 4-chloro-6,7,8-trimethoxy quinazoline.—18.0 g. of 2 - phenyl - 6,7,8 - trimethoxy-[3H]-4-quinazolone is allowed to reflux in 45 mls. phosphorous oxychloride under nitrogen for 15 minutes. The solution is cooled to 30° C. and added slowly to 500 ml. ice and water with stirring. The acids are neutralized with concentrated ammonia and crystals are filtered and washed several times with water. The product is dissolved in 200 ml. chloroform, dried and evaporated in vacuo to obtain 2 - phenyl - 4-chloro-6,7,8-trimethoxy quinazoline, M.P. 156–158° C.

Step E: Preparation of 2-phenyl-4-[4-(2-hydroxyethyl) piperazino]-6,7,8-trimethoxy quinazoline.—A mixture of 4.10 g. of 2-phenyl-4-chloro-6,7,8-trimethoxy quinazoline, 1.69 g. of 1-(2-hydroxyethyl)piperazine and 15 ml. of isopropanol is refluxed for 1.75 hours. The inorganics are filtered off and the filtrate evaporated to an oil. The oil is dissolved in 50 mls. dry ether and placed in a refrigerator. Upon standing, crystals formed to yield to yield 2-phenyl - 4 - [4 - (2 - hydroxyethyl)piperazino]-6,7,8-trimethoxy quinazoline, M.P. 117–118.5° C.

Step F: Preparation of 4-[4-(2-hydroxyethyl)piperazino]-2-phenyl-6,7,8-trimethoxy quinazoline nitrate and dihydrochloride.—The nitrating reagent is prepared by adding dropwise 1.16 mls. of 90% nitric acid to 3.50 mls. acetic anhydride while keeping the temperature between 10° C. and 20° C. To the well stirred nitrating solution under nitrogen is added dropwise a solution of 2.55 g. of 2-phenyl-4-[4-(2-hydroxyethyl)piperazino]-6,7,8-trimethoxy quinazoline dissolved in 2 mls. dry acetic acid while keeping the temperature between 0° C. and —5° C. After addition (5 minutes), the mixture is allowed to stir for 20 minutes at 0° C. before working up by pouring the reaction mixture on 200 mls. ice and water and neutralizing the acids with concentrated ammonia. The product is extracted with 150 mls. chloroform, dried, and evaporated to an oil which is dissolved in chloroform (minimum volume) and filtered through 150 mls. silica gel using chloroform to elute the column. A light yellow oil is obtained from the column which crystallizes upon the addition of dry ether to yield white crystals of the free base of the title compound, m.p. 109° C. (decomp.).

2.0 g. of the free base is converted to the dihydrochloride by dissolving the free base in 100 mls. methanol. The methanol solution is made strongly acidic to PH paper using ethanolic hydrogen chloride. The resulting solution is evaporated to a volume of 40 mls. Addition of 40 mls. dry ether yields pale yellow crystals which are filtered, washed with ether and dried to obtain the dihydrochloride acid addition salt form of the title compound, M.P. 193° C. (decomp.).

EXAMPLE 2

Following the procedure of Steps E and F of Example 1, the following additional compounds are prepared:

(A–1) 4-(5-hydroxypentyl)amino-2-phenyl-6,7,8-trimethoxyquinazoline hydrochloride, M.P. 186–187° C.

(A–2) 4-(5-hydroxypentyl)amino-2-phenyl-6,7,8-trimethoxyquinazoline nitrate hydrochloride, m.p. 130–131° C. (decomp.).

(B–1) 4-(4-hydroxybutyl)amino-2-(p-chlorophenyl)-6,7,8-trimethoxyquinazoline.

(B–2) 4-(4-hydroxybutyl)amino-2-(p-chlorophenyl)-6,7,8-trimethoxyquinazoline nitrate maleate.

(C–1) 4-[4-(2-hydroxyethyl)-1-piperazino]-2-phenyl-6,7,8-triethoxyquinazoline.

(C–2) 4-[4-(2-hydroxyethyl)-1-piperazino]-2-phenyl-6,7,8-triethoxyquinazoline nitrate dihydrochloride.

(D–1) 4-[3-bis(3-hydroxyethyl)aminopropyl]amino-2-phenyl-6,7,8-trimethoxyquinazoline, m.p. 123.5–125° C.

(D–2) 4-[3-bis(3-hydroxyethyl)aminopropyl]amino-2-phenyl-6,7,8-trimethoxyquinazoline dihydrochloride, m.p. 147° C. (decomp.).

(E–1) 4-[4-bis(2-hydroxyethyl)aminobutyl]amino-2-phenyl-6,7-dimethoxyquinazoline.

(E–2) 4-[4-bis(2-hydroxyethyl)aminobutyl]amino-2-phenyl-6,7-dimethoxyquinazoline dinitrate dihydrochloride.

(F–1) 4-(4-hydroxymethyl-5-hydroxypentyl)amino-2-phenyl-6,7,8-trimethoxyquinazoline.

(F–2) 4-(4-hydroxymethyl-5-hydroxypentyl)amino-2-phenyl-6,7,8-trimethoxyquinazoline dinitrate dihydrochloride.

(G–1) 4-(6-hydroxyhexyl)amino-2-(p-methylphenyl)-6,7,8-trimethoxyquinaxoline.

(G–2) 4-(6-hydroxyhexyl)amino-2-(p-methylphenyl)-6,7,8-trimethoxyquinazoline nitrate maleate.

(H–1) 4-di(2-hydroxyethyl)amino-2-phenyl-6,7,8-trimethoxyquinazoline.

(H–2) 4-di(2-hydroxyethyl)amino-2-phenyl-6,7,8-trimethoxyquinazoline dinitrate hydronitrate.

(I–1) 4-(2,3-dihydroxypropyl)amino-2-phenyl-6,7,8-trimethoxyquinazoline.

(I–2) 4-(2,3-dihydroxypropyl)amino-2-phenyl-6,7,8-trimethoxyquinazoline dinitrate maleate.

(J–1) 4-[2-bis(2-hydroxyethyl)aminopropyl]amino-2-phenylquinazoline.

(J–2) 4-[2-bis(2-hydroxyethyl)aminopropyl]amino-2-phenylquinazoline dinitrate dihydrochloride.

(K–1) 4-(5-hydroxypentyl)amino-2-phenyl-6,7-dimethylquinazoline.

(K–2) 4-(5-hydroxypentyl)amino-2-phenyl-6,7-dimethylquinazoline nitrate hydronitrate.

EXAMPLE 3

Alternate procedure for 2-phenyl-6,7,8-trimethoxy-[3H]-4-quinazolone

Step A: To 25 g. of 3,4,5-trimethoxybenzoyl chloride dissolved in 150 ml. methylene chloride is added dropwise dimethylamine while keeping the temp below 20° C. The addition of dimethylamine is stopped when the reaction mixture is strongly basic to litmus paper and the exothermicity had ceased. The reaction mixture is diluted to 300 mls. with methylene chloride and extracted with 200 mls. water. The methylene chloride phase is dried and the solvent evaporated off to yield N,N-dimethyl-benzamide.

Step B: 25.8 g. N,N-dimethyl-benzamide is dissolved in 40 mls. phosphorus oxychloride under nitrogen. To the resulting solution is added portionwise 26.0 g. of methyl 2 amino-3,4,5-trimethoxybenzoate while keeping the temp. between 20 to 25° C. After addition is complete, the resulting mixture is stirred for 16 hours at room temp. and then 45 minutes at 40° C. The reaction mixture is then worked up by pouring on to 500 mls. ice water and neutralizing with conc. ammonia. The product is extracted with 300 mls. of chloroform, dried and evaporated to an oil. Addition of dry ether yields 2-(α-dimethylamino-benzylideneamino) - 3,4,5 - trimethoxybenzoic acid methyl ester.

Step C: A mixture of 42.5 g. of 2-(α-dimethylamino-benzylideneamino)-3,4,5-trimethoxybenzoic acid methyl ester, 100 ml. of ammonia and 11 g. of ammonium chloride is placed in a reaction bomb and allowed to heat to 110° C. for 22 hours. The ammonium is allowed to evaporate off and the resulting solids are washed several times with water. The solids are then dissolved in chloroform, dried, charcoaled, and finally the solvent is evaporated off to yield 2-phenyl-6,7,8-trimethoxy-[3H]-4-quinazolone, M.P. 243–246° C.

What is claimed is:

1. A compound of the formula:

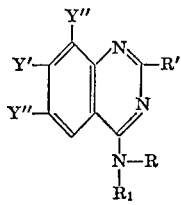

wherein

R' is

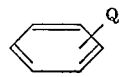

Q is hydrogen, halo of atomic weight of from 18 to 80 or alkyl of 1 to 4 carbon atoms, R is from the group of:

(a) $-CH_2(-CH_2)_n-ONO_2$ (b) 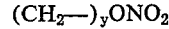
$-CH_2\left(-\underset{R°}{CH}\right)_n-ONO_2$ (c) $R''$
$-CH(-CH_2)_n-ONO_2$ (d) $-CH_2(-CH_2)_z-N[-CH_2(-CH_2)_y-ONO_2]_2$ $R_1$ is from the group of:

(e) $-CH_2(-CH_2)_n-ONO_2$ when R is (a) as above defined, (f) hydrogen or alkyl of 1 to 4 carbon atoms $R''$ is $-(CH_2-)_xCH_3$ or $-(CH_2-)_yONO_2$ $R°$ is hydrogen, $-(CH_2-)_mCH_3$ or $(CH_2-)_yONO_2$ provided that one R° is other than hydrogen, that the sum of $n$ and $m$ does not exceed 7 and the sum of $n$ and $y$ does not exceed 8, or R and $R_1$ together with the 4-amino nitrogen attached to the quinazoline ring form

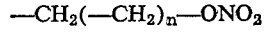

$n$ is 1 to 6,
$m$ is 0 to 4,
$x$ is 0 to 1,
$y$ is 1 to 4,
$z$ is 1 to 4, and each of Y, Y' and Y" is, independently, hydrogen, alkoxy of from 1 to 3 carbon atoms, alkyl of 1 to 3 carbon atoms, or Y and Y' together form methylenedioxy, provided that no more than 2 of Y, and Y' and Y" are alkyl, or a pharmaceutically acceptable acid addition salt thereof.

2. A compound of claim 1 in which $R_1$ is hydrogen.

3. A compound of claim 2 in which R is $-CH_2(-CH_2)_n-ONO_2$

4. The compound of claim 3 in which $n$ is 4 and each of Y, Y' and Y" is methoxy and Q is hydrogen.

5. A compound of claim 2 in which R is $-CH_2(-CH_2)_z-N[-CH_2(CH_2)_y-ONO_2]_2$ 6. A compound of claim 5 in which $y$ is 1 and $z$ is 2.

7. The compound of claim 6 in which each of Y, Y' and Y" is methoxy and Q is hydrogen.

8. A compound of claim 1 in which R and $R_1$ together with the nitrogen attached to the quinazoline ring form

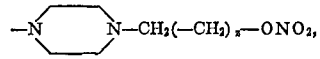

9. A compound of claim 8 in which $z$ is 1.

10. The compound of claim 9 in which each of Y, Y' and Y" is methoxy and Q is hydrogen.

References Cited
UNITED STATES PATENTS

| | | | |
|---|---|---|---|
| 3,449,498 | 6/1969 | De Stevens et al. | 424—251 |
| 3,517,005 | 6/1970 | Cronin et al. | 260—256.4 |
| 3,637,699 | 1/1972 | Gabel et al. | 260—256.4 |
| 3,637,700 | 1/1972 | Gabel et al. | 260—256.4 |
| 3,637,701 | 1/1972 | Gabel et al. | 260—256.4 |

DONALD G. DAUS, Primary Examiner

R. V. RUSH, Assistant Examiner

U.S. Cl. X.R.

424—251